(12) United States Patent
Zhang et al.

(10) Patent No.: US 10,664,485 B2
(45) Date of Patent: May 26, 2020

(54) BLOCK CHAIN MINING METHOD, DEVICE, AND NODE APPARATUS

(71) Applicant: CLOUDMINDS (SHENZHEN) ROBOTICS SYSTEMS CO., LTD., Shenzhen (CN)

(72) Inventors: Yueyang Zhang, Shenzhen (CN); Hui Xie, Shenzhen (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 0 days.

(21) Appl. No.: 16/314,986

(22) PCT Filed: Dec. 23, 2016

(86) PCT No.: PCT/CN2016/111860
§ 371 (c)(1),
(2) Date: Jan. 3, 2019

(87) PCT Pub. No.: WO2018/112949
PCT Pub. Date: Jun. 28, 2018

(65) Prior Publication Data
US 2019/0310980 A1    Oct. 10, 2019

(51) Int. Cl.
*G06F 17/00* (2019.01)
*G06F 16/2458* (2019.01)
(Continued)

(52) U.S. Cl.
CPC ...... *G06F 16/2465* (2019.01); *G06F 16/2365* (2019.01); *G06F 16/27* (2019.01);
(Continued)

(58) Field of Classification Search
None
See application file for complete search history.

(56) References Cited

U.S. PATENT DOCUMENTS

2016/0218879 A1    7/2016  Ferrin
2016/0358253 A1*  12/2016  Liao .................. G06Q 40/04
(Continued)

FOREIGN PATENT DOCUMENTS

| CN | 105469510 A | 4/2016 |
|---|---|---|
| CN | 106060036 A | 10/2016 |

OTHER PUBLICATIONS

International Search Report and Written Opinion Issued in Corresponding PCT Application No. PCT/CN2016/111860, dated Sep. 29, 2017 (8 Pages with English Translation of International Search Report).

*Primary Examiner* — Hung D Le
(74) *Attorney, Agent, or Firm* — Osha Liang LLP (57) ABSTRACT

A blockchain mining method, device, and a node apparatus are used to solve the technical problem of unequal distribution of mining opportunities for node apparatuses in a blockchain network. The method comprises: acquiring a current block number of the blockchain; judging whether a hash slot corresponding to the block number is consistent with a hash slot corresponding to the node apparatus, wherein the node apparatuses in the blockchain network are distributed in N hash slots by means of a hash algorithm, and N is a positive integer greater than or equal to 2; and determining whether the node apparatus performs mining this time according to a judgment result.

6 Claims, 3 Drawing Sheets

(51) Int. Cl.
*G06F 16/27* (2019.01)
*G06F 16/23* (2019.01)
*H04L 9/06* (2006.01)
*H04L 9/08* (2006.01)
*H04L 29/08* (2006.01)

(52) U.S. Cl.
CPC .......... *H04L 9/0637* (2013.01); *H04L 9/0643* (2013.01); *H04L 9/0869* (2013.01); *H04L 67/104* (2013.01); *G06F 2216/03* (2013.01); *H04L 2209/38* (2013.01)

(56) References Cited

U.S. PATENT DOCUMENTS

| | | | |
|---|---|---|---|
| 2017/0345011 A1* | 11/2017 | Salami | G06Q 20/42 |
| 2018/0019921 A1* | 1/2018 | Davis | H04L 41/0836 |
| 2018/0129953 A1* | 5/2018 | Saxena | G06N 5/048 |
| 2018/0129957 A1* | 5/2018 | Saxena | G06N 5/022 |
| 2018/0129958 A1* | 5/2018 | Saxena | G06Q 20/3825 |

* cited by examiner

BLOCK CHAIN MINING METHOD, DEVICE, AND NODE APPARATUS

CROSS-REFERENCE TO RELATED APPLICATIONS

This application claims the benefit of PCT application No. PCT/CN2016/111860 filed on Dec. 23, 2016 and Chinese publication No. CN107078903A filed on Apr. 14, 2017, the contents of which are incorporated herein by reference.

FIELD OF THE INVENTION

The present invention relates to the field of blockchains, in particular to a blockchain mining method, device, and node apparatus.

BACKGROUND OF THE INVENTION

The blockchain technology is a distributed, decentralized, and detrusted network data consensus storage technology. It implements synchronization of distributed computing based on a unique block generation mechanism and a P2P (Point to Point) network communication mechanism. Generally speaking, in the process of forming a blockchain, each node participating in computing enjoys the authority to compute a block, wherein computing a block is commonly called "mining", and the related technology ensures that the longest chain is a valid chain through a specific mining mechanism.

In an existing blockchain network, which node apparatus generates a block is related to the computing capability of the node apparatus, and the stronger the computing capability of a node apparatus is, the more likely it is to generate a block. For example, when the computing capability of a node apparatus exceeds the computing capability of all other nodes in the entire network, this node apparatus may basically generate a block every time. Therefore, the existing mining mechanism cannot guarantee that node apparatuses in a blockchain network have equal mining opportunities when the computing capacities of the node apparatuses are quite different.

It can be seen from the above that based on the existing mining mechanism, if the same user or organization controls most of the computing capability in the blockchain network, a monopoly may be formed, thereby hindering the normal operation of the blockchain, destroying the data of the blockchain, and threatening the security of the blockchain network.

SUMMARY OF THE INVENTION

The main object of the present invention is to provide a blockchain mining method, device, and node apparatus for solving the technical problem of unequal mining opportunities for node apparatuses in a blockchain network.

In order to achieve the above object, a first aspect of the present invention provides a blockchain mining method applied to a node apparatus in a blockchain network, the method comprising:

acquiring a current block number of the blockchain;

judging whether a hash slot corresponding to the block number is consistent with a hash slot corresponding to the node apparatus, wherein the node apparatuses in the blockchain network are distributed in N hash slots by means of a hash algorithm, and N is a positive integer greater than or equal to 2;

determining whether the node apparatus performs mining this time according to a judgment result.

A second aspect of the present invention provides a mining device applied to a node apparatus in a blockchain network, the device comprising:

an acquisition module configured to acquire a current block number of the blockchain;

a judgment module configured to judge whether a hash slot corresponding to the block number is consistent with a hash slot corresponding to the node apparatus, wherein the node apparatuses in the blockchain network are distributed in N hash slots by means of a hash algorithm, and N is a positive integer greater than or equal to 2;

a determination module configured to determine whether the node apparatus performs mining this time according to a judgment result.

A third aspect of the present invention provides a node apparatus, comprising:

a processor unit, a communication interface, a memory and a communication bus; wherein the processor unit, the communication interface and the memory communicate with each other through the communication bus;

the memory is configured to store program codes;

the processor unit is configured to execute the program codes to implement the method of the first aspect.

A fourth aspect of the invention provides a computer readable storage medium for storing a computer program, the computer program comprising instructions for performing the method of the first aspect.

With the above technical solutions, all the node apparatuses in the blockchain network are uniformly distributed in different hash slots. As the block number of the current blockchain increases each time, node apparatuses for performing mining also change, ensuring that the same node apparatus cannot continuously generate blocks. Thus, the mining probability of a node apparatus with strong computing capability is reduced, and the mining probability of a node apparatus with weak computing capability is increased, so that the mining opportunities of node apparatuses in the blockchain network are more equal.

BRIEF DESCRIPTION OF THE DRAWING

In order to illustrate the embodiments of the present invention or the technical solutions in the prior art more clearly, the drawings which need to be used in the description of the embodiments will be briefly described below. It is obvious that the drawings in the following description are about some embodiments of the present invention. For those of ordinary skill in the art, other drawings may also be obtained according to the drawings without creative labor.

DETAILED DESCRIPTION OF THE EMBODIMENTS

In order to enable the objects, the technical solutions and the advantages of the embodiments of the present invention to become clearer, the technical solutions in the embodiments of the present invention will be clearly and completely described below with reference to the accompanying drawings in the embodiments of the present invention. Obviously, the described embodiments are only one part of the embodiments of the present invention rather than all of the embodiments. Based on the embodiments in the present invention, all the other embodiments obtained by those of ordinary skill in the art without creative effort are still within the scope of the claimed present invention.

In order to enable those of skill in the art to understand the technical solutions provided by the embodiments of the present invention more easily, the related technologies involved will be first briefly introduced below.

A blockchain is a decentralized distributed database system in which all nodes in a blockchain network participate ire maintenance, it is composed of a series of data blocks generated on the basis of cryptography, and each data block is a block in the blockchain. According to the sequence of generation time, the blocks are linked together orderly to from a data chain, which is vividly called the blockchain. The blockchain generates and verities the protocol by the special blocks and transactions and has the safety features of unchangeability, unforgeability and full traceability.

Each block in a blockchain includes some recent transactions, references to the previous block, and other data, as well as an answer to computing difficulty, and the answer is unique to each block. If a new block does not have the correct answer, it cannot be sent to the network. That is to say, the process of "mining" is essentially "solving" a current block in competition. The math problem in each block is difficult to solve, but once a valid solution is found, other network nodes can easily verify the correctness of the solution. Specifically in Bitcoin, "mining" is actually the process of accounting. The operation of Bitcoin uses a mechanism called "Proof of Work (PoW)", In order to find out which has more powerful computing capability, the system will issue a math problem each time, and only the computer that solves this problem the fastest can perform accounting.

In addition, in the blockchain network, not all nodes participate in mining, and some nodes may only have the functions of querying and publishing transactions. Among them, a node that participates in mining is called a miner node, and the nodes described hereinafter are all miner nodes.

Figure 1:
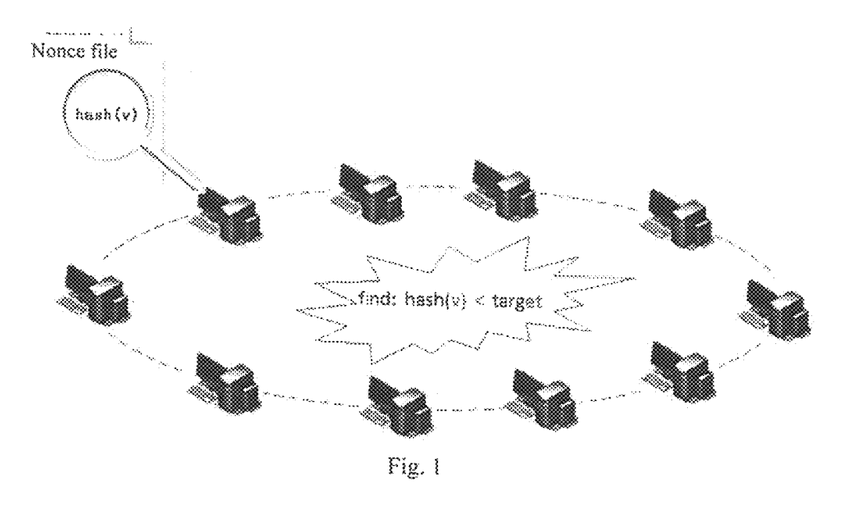
FIG. 1 is a schematic diagram of a blockchain network provided in an embodiment of the present invention.

A blockchain and the mining process thereof are described in detail below based on FIG. 1. As shown in FIG. 1, node apparatuses of certain data establish connection with each other through a p2p network to form a basic network of the blockchain. In mining, it first needs to calculate the target value corresponding to a current block according to an established protocol of the blockchain, that is, target=F, where F is the target value of a previous block and the time difference between the previous block and the current block. Then each node apparatus in the network uses the current block number as a seed to generate a very large nonce file. Each node apparatus will continuously traverse the nonce in the nonce file and do the hash (nonce) operation. When the node apparatus finds a nonce v of hash(v)<target from the file, it indicates that the current round of mining ends, and the node apparatus that finds the v value first among all the node apparatuses obtains the write block permission.

Based on the above process, it can be seen that in the case that all node apparatuses participate in each mining, the higher the computing capability of a node apparatus is, the greater the probability that the mining will generate a block is. If an attacker controls most of the computing capability in the blockchain network and forms a "51% attack", the data of the blockchain network can be destroyed.

Figure 2:
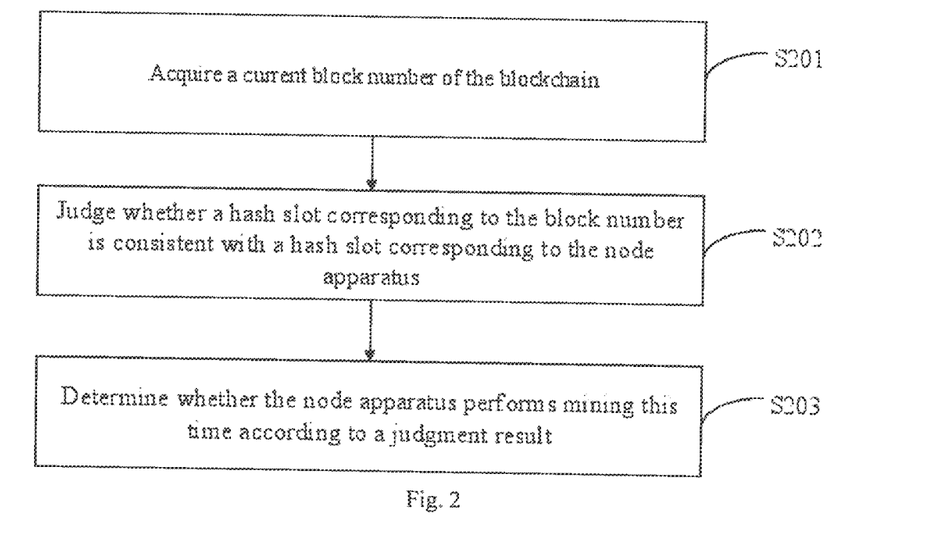
FIG. 2 is a flow diagram of a blockchain mining method provided in an embodiment of the present invention.

An embodiment of the present invention provides a blockchain mining method applied to a node apparatus in a blockchain network. As shown in FIG. 2, the method comprises:

S201, acquiring a current block number of the blockchain.

Wherein the blockchain is synchronized locally in the node apparatus. Therefore, the node apparatus can acquire the current block number by querying the locally stored blockchain.

S202, judging whether a hash slot corresponding to the block number is consistent with a hash slot corresponding to the node apparatus.

Wherein the node apparatuses in the blockchain network are distributed in N hash slots by means of a hash algorithm, and N is a positive integer greater than or equal to 2;

S203, determining whether the node apparatus performs mining this time according to a judgment result.

That is to say, before each mining, the node apparatus needs to go through step S202 to determine whether to perform mining this time.

With the above method, all the node apparatuses in the blockchain network are uniformly distributed in different hash slots. As the block number of the current blockchain increases each time, node apparatuses for performing mining also change, ensuring that the same node apparatus cannot consecutively generate blocks. Thus, the mining probability of a node apparatus with strong computing capability is reduced, and the mining probability of a node apparatus with weak computing capability is increased, so that the mining opportunities of node apparatuses in the blockchain network are more equal.

In order to make those skilled in the art better understand the technical solutions provided in the embodiments of the present invention, the above steps are described in detail below.

First, an example is given to illustrate how to implement uniform distribution of node apparatuses in N hash slots in a blockchain network.

An MD5 (Message Digest Algorithm MD5, "消息摘要算法第五版" in Chinese) hash operation is performed on the account information of each node apparatus, the mining account is subjected to modulo operation on N (i.e., calculating the remainder on N) by using the characteristic of random and uniform distribution of hash results, so that each account will correspond to a hash slot numbered between 0 and N−1.

It is worth noting that the same node apparatus may have multiple accounts that can be logged in. The account information of the node apparatus described herein refers to the current account information of the node apparatus, that is, one node apparatus corresponding to one account in the blockchain network. To facilitate understanding, a node apparatus described herein can be considered as an account in the blockchain network.

Figure 3:
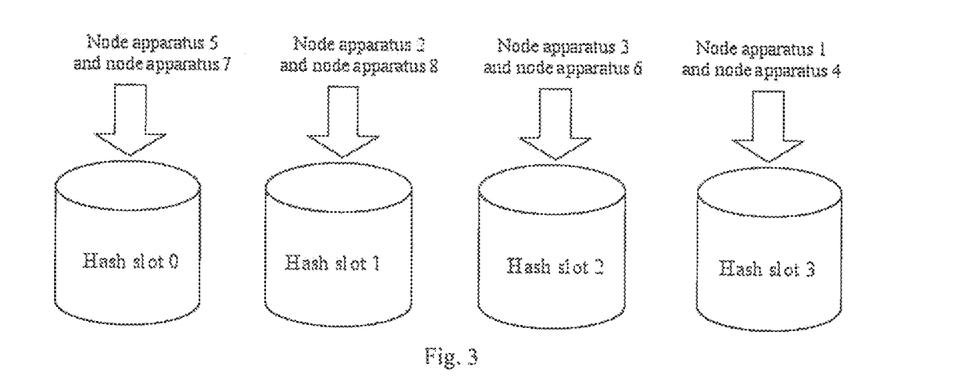
FIG. 3 is a schematic diagram of node apparatuses distributed in hash slots provided in an embodiment of the present invention.

As shown in FIG. 3, when N is equal to 4, after calculating the hash value on the account information of a node apparatus by using the MD5 algorithm, as the hash value has the characteristic of random and uniform distribution, all node apparatuses can be uniformly distributed to hash slot 0, hash slot 1, hash slot 2 and hash slot 3 after calculating the remainder on N by using the hash value. That is to say, each hash slot corresponds to approximately one-quarter of the node apparatuses in the blockchain network. For example, there are eight node apparatuses 1-8 in a blockchain network, and the hash values solved for account information of each node apparatus in turn by using the MD5 algorithm are 63, 17, 46, 27, 36, 82, 24, and 41, respectively. The values obtained by modulo on 4 are 3, 1, 2, 3, 0, 2, 0, and 1. It can be obtained that node apparatus 5 and node apparatus 7 correspond to hash slot 0, node apparatus 2 and node apparatus 8 correspond to hash slot 1, node apparatus 3 and node apparatus 6 correspond to hash slot 2, and node apparatus 1 and node apparatus 4 correspond to hash slot 3.

It is worth noting that when a new node apparatus is added to the blockchain network by using the above method, only the hash slot corresponding to the newly added node apparatus needs to be calculated without adjusting hash slots of existing node apparatuses, thus facilitating the expansion of the blockchain network.

In addition, the above examples are only for illustration, the embodiments of the present invention may further use other hash algorithms to uniformly distribute all the node apparatuses in respective hash slots, and the present invention is not limited thereto.

In this way, after acquiring the current block number of the blockchain, the calculation of the hash slot corresponding to the block number may be as follows: the current block number is used to perform modulo operation on N, and the obtained value is the serial number of the corresponding hash slot.

Still using FIG. 3 as an example, if the current block number of the blockchain is 8728 and the remainder on 4 is 0, the hash slot corresponding to the current block is hash slot 0.

Further, in a possible implementation manner of the embodiments of the present invention, the above step S203 may specifically comprise: determining that the node apparatus does not perform mining this time when the hash slot corresponding to the block number is consistent with the hash slot corresponding to the node apparatus; and determining that the node apparatus performs mining this time when the hash slot corresponding to the block number is not consistent with the hash slot corresponding to the node apparatus.

For example, as shown in FIG. 3, if the current block number of the blockchain is 1, and the remainder on 4 by using the block number is equal to 1, then node apparatuses 2 and 8 corresponding to hash slot 1 do not participate in mining of a next block. After other node apparatus performs mining to generate the next block, the block number of the blockchain is 2, and the remainder on 4 is equal to 2, then node apparatus 3 and node apparatus 6 corresponding to hash slot 2 do not participate in mining of the third block. According to the above process, as the block number keeps increasing, the corresponding hash slots also keep changing, so that node apparatuses participating in mining also change each time, and then the same node apparatus cannot generate blocks several times consecutively, thereby improving the mining equality for node apparatuses.

It is worth noting that, considering that a node apparatus cannot perform mining due to a possible fault, there may be a situation that no node apparatus may participate in certain mining in the blockchain network. For example, in FIG. 3, the current block number is 3, and the remainder on 4 by using the block number is equal to 3, then node apparatuses 1 and 4 corresponding to hash slot 3 do not participate in mining of the next block. If all other node apparatuses cannot perform mining due to a fault, then no node apparatus may participate in mining this time, and the block number of the blockchain will not increase.

Therefore, an embodiment of the present invention may further include: determining that the node apparatus performs mining this time when the hash slot corresponding to the block number acquired in consecutive M times is consistent with the hash slot corresponding to the node apparatus, where M is a positive integer greater than or equal to 2. That is to say, if the block number acquired by a node apparatus in consecutive M times has not changed, resulting in that the node apparatus has no participation in mining in continuous M−1 times, then the node apparatus can perform mining at the Mth time, thus ensuring the normal operation of the blockchain network.

Wherein the specific value of M can be preset according to actual conditions. Still using FIG. 3 as an example, if the current block number of the blockchain acquired by node apparatus 1 is 7, as the hash slot corresponding to the block number 7 is hash slot 3, node apparatus 1 does not participate in mining of the 8th block this time. In the next mining, if the current block number of the blockchain acquired by node apparatus 1 is still 7, it indicates that other node apparatuses did not participate in the previous mining. Thus, in the case where M is equal to 2, node apparatus 1 determines to perform mining this time. In the case where M is equal to 4, if node apparatus 1 still does not perform mining this time, when the block number increases the next time, it indicates that the other node apparatus resumes normal mining. If the block number does not change for four consecutive times, node apparatus 1 determines to perform mining, thus ensuring the normal operation of the blockchain network.

Further, an embodiment of the present invention may further verify whether the node apparatus legally generates a block this time according to the judgment of a hash slot after the block is generated. Specifically, the mining method provided in the embodiment of the present invention further comprises: receiving a block sent by another node apparatus in the blockchain network, wherein the block includes account information of the another node apparatus; and performing proof of work on the block when it is determined that the hash slot corresponding to the block number is not consistent with the hash slot corresponding to the another node apparatus.

For example, as shown in FIG. 3, node apparatus 3 broadcasts the block to other node apparatuses after successful mining this time; after receiving the block broadcast by node apparatus 3, node apparatus 1 performs an MD5 hash operation on account information of node apparatus 3 to obtain a hash value, uses the hash value to calculate the remainder on 4 to determine that node apparatus 3 corresponds to hash slot 2, and then calculates the remainder on 4 according to the current block number of the blockchain to determine the hash slot corresponding to the current block number; if the hash slot corresponding to the current block number is not consistent with the hash slot corresponding to node apparatus 3, it indicates that node apparatus 3 legally performs mining this time, and proof of work on the block can be performed. If the hash slot corresponding to the current block number is consistent with the hash slot corresponding to node apparatus 3, it indicates that node apparatus 3 illegally performs mining this time, and node apparatus 1 may discard the block to refuse addition of the block to the blockchain. Alternatively, when the hash slot corresponding to the current block number is consistent with the hash slot corresponding to node apparatus 3, and the block number of the current blockchain has not changed for M times, then node apparatus 1 may determine that node apparatus 3 legally performs mining this time, and proof of work on the block can be further performed. In a specific implementation, a node 1 can comprehensively judge whether a node 3 legally performs mining this time by combining the hash slot and the time difference between the block and the previous block.

In another possible implementation manner of the embodiments of the present invention, the above step S203 may further comprise: determining that the node apparatus performs mining this time when the hash slot corresponding to the block number is consistent with the hash slot corresponding to the node apparatus; and determining that the node apparatus does not perform mining this time when the hash slot corresponding to the block number is not consistent with the hash slot corresponding to the node apparatus.

For example, as shown in FIG. 3, if the current block number of the blockchain is 1, and the remainder on 4 by using the block number is equal to 1, then node apparatuses 2 and 8 corresponding to hash slot 1 participate in mining of a next block, and all other node apparatuses do not participate in mining of the next block. After node apparatus 2 or node apparatus 8 performs mining to generate the next block, the block number of the blockchain is 2, and the remainder on 4 is equal to 2, then node apparatus 3 and node apparatus 6 corresponding to hash slot 2 participate in mining of the third block, and other node apparatuses do not participate in mining of the third block. This proceeds as in the above process. As the block number keeps increasing, the corresponding hash slots also keep changing, so that node apparatuses participating in mining also change each time, and then the same node apparatus cannot generate blocks several times consecutively, thereby improving the mining equality for the node apparatuses.

Similarly, considering that a node apparatus cannot perform mining due to a possible fault, there may be a situation that no node apparatus may participate in certain mining in the blockchain network. An embodiment of the present invention may further comprise: determining that the node apparatus performs mining this time when the hash slot corresponding to the block number acquired in consecutive L times is not consistent with the hash slot corresponding to the node apparatus, where L is a positive integer greater than or equal to N.

That is to say, for N hash slots, normally, one node apparatus will participate in mining at least once in every N times of mining. If a certain node apparatus does not participate in mining for consecutive L−1 times, it indicates that other node apparatuses may be faulty. Therefore, the node apparatus may perform mining when the hash slot corresponding to the block number determined in the consecutive Lth time is not consistent with the hash slot corresponding to the node apparatus, thus ensuring the normal operation of the blockchain network.

The above two possible implementation manners are only examples. In a specific implementation, a node apparatus may be configured to in what way to judge whether to perform mining each time according to a specific service.

The specific effects that can be achieved by the mining method provided in the embodiment of the present invention are analyzed for the first possible implementation manner described above.

As illustrated in FIG. 3, all node apparatuses in the blockchain are divided into four hash slots by using account MD5 hash values. The block number is used to perform modulo operation on 4, thus hitting slots from hash slot 0 to hash slot 3 in turn. Node apparatuses in the slots will be periodically prohibited from participating in mining, thereby achieving the purpose of prohibiting the mining of a node apparatus with powerful computing capability, and finally avoiding the monopoly of the node apparatus with powerful computing capability on the blockchain and improving the attacker's double-spending attack difficulty. The existing proof of work mechanism enables a double-spending attack as long as there is one node apparatus with powerful computing capability. After the embodiment of the present invention is implemented, at least four node apparatuses with powerful computing capability are required to achieve a double-spending attack, thereby improving the attacker's crime cost.

The fault tolerance capability and anti-attack capability in the embodiments of the present invention are analyzed below. If the fault probability of each node apparatus is 2.5%, the probability of each node apparatus being maliciously attacked is 25%, the number of hash slots is 4, and the total number of node apparatuses is X, then freezing will occur when the other node apparatuses are faulty, the total number of available node apparatuses is less than X/4 and they are all in the same slot, that is the case of node apparatuses not participating in mining, and the probability distribution of this case is consistent with the cumulative binomial distribution. The experimental results show that when X=5, the probability of freezing is 1.914E-6, which is a probability of one millionth. And as X increases, the probability of freezing will gradually approach 0, indicating that the blockchain network using the mining method provided in the embodiment of the present invention has high fault tolerance capability.

With regard to the anti-attack capability, when the total number of available node apparatuses is less than X/4 and they are all in the same slot due to being attacked, the writing of the entire block will be completely grasped by the intruder. This probability also conforms to the cumulative binomial distribution. The experimental results show that when X=18 the probability of being controlled is 3.9482E-6 and then as X increases, the probability will gradually approach 0, indicating that the blockchain network using the mining method provided in the embodiment of the present invention has high anti-attack capability.

Thus, it can be seen that the method provided in the embodiment of the present invention ensures that the mining opportunities of node apparatuses in the blockchain network are more equal under the premise of ensuring that the blockchain network has sufficient fault tolerance capability and anti-attack capability.

Figure 4A:
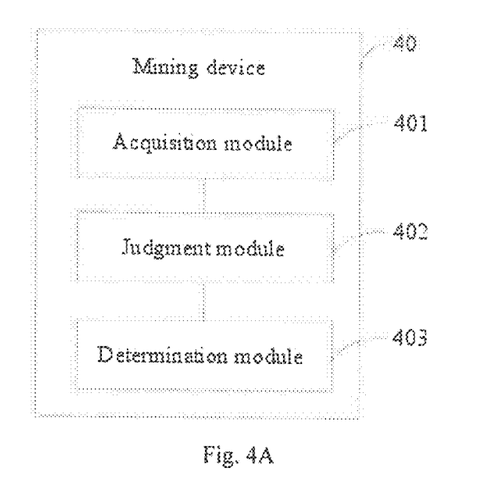
FIG. 4A is a structural diagram of a mining device provided in an embodiment of the present invention.

An embodiment of the present invention further provides a mining device 40 applied to a node apparatus in a blockchain network and configured to implement a blockchain mining method provided in the above method embodiments. As shown in FIG. 4A, the mining device 40 comprises:

an acquisition module 401 configured to acquire a current block number of the blockchain;

a judgment module 402 configured to judge whether a hash slot corresponding to the block number is consistent with a hash slot corresponding to the node apparatus, wherein the node apparatuses in the blockchain network are distributed in N hash slots by means of a hash algorithm, and N is a positive integer greater than or equal to 2;

a determination module 403 configured to determine whether the node apparatus performs mining this time according to a judgment result.

With the above mining device, all the node apparatuses in the blockchain network are uniformly distributed in different hash slots. As the block number of the current blockchain increases each time, node apparatuses for performing mining also change, ensuring that the same node apparatus cannot consecutively generate blocks. Thus, the mining probability of a node apparatus with strong computing capability is reduced, and the mining probability of a node apparatus with weak computing capability is increased, so that the mining opportunities of node apparatuses in the blockchain network are more equal.

Optionally, the determination module 403 is configured to determine that the node apparatus does not perform mining this time when the hash slot corresponding to the block number is consistent with the hash slot corresponding to the node apparatus; and determine that the node apparatus performs mining this time when the hash slot corresponding to the block number is not consistent with the hash slot corresponding to the node apparatus.

Optionally, the determination unit 403 is configured to determine that the node apparatus performs mining this time when the hash slot corresponding to the block number acquired in consecutive M times is consistent with the hash slot corresponding to the node apparatus, where M is a positive integer greater than or equal to 2.

Figure 4B:
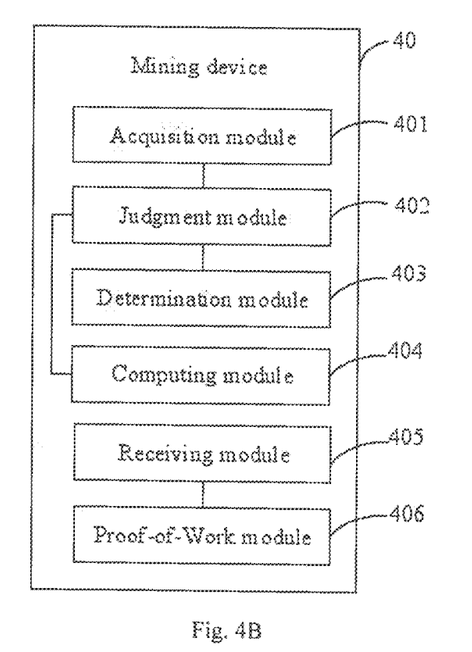
FIG. 4B is a structural diagram of an another mining device provided in an embodiment of the present invention.

Optionally, as shown in FIG. 4B, the mining device 40 further comprises: a computing unit 404 configured to perform a modulo operation on N by using the block number to obtain a first modulo value, and perform the modulo operation on N by using account information of the node apparatus according to an MD5 algorithm to obtain a second modulo value; the judgment module 402 is configured to judge whether the first modulo value is consistent with the second modulo value, wherein if the first modulo value is consistent with the second modulo value, it indicates that the hash slot corresponding to the block number is consistent with the hash slot corresponding to the node apparatus, and if the first modulo value is not consistent with the second modulo value, it indicates that the hash slot corresponding to the block number is not consistent with the hash slot corresponding to the node apparatus.

Optionally, as shown in FIG. 4B, the ruining device 40 further comprises: a receiving module 405 configured to receive a block sent by another node apparatus in the blockchain network, wherein the block includes account information of the another node apparatus; and a proof of work module 406 configured to perform proof of work on the block when it is determined that the hash slot corresponding to the block number is not consistent with the hash slot corresponding to the another node apparatus.

Those skilled in the art can clearly understand that for the convenience and brevity of the description, only the division of the above functional modules is exemplified. In practical applications, the above functions assignment can be performed by different functional modules as needed. That is, the internal structure of the device is divided into different functional modules to perform all or part of the functions described above. For the specific working process of the above functional modules, reference can be made to the corresponding process in the above method embodiment, and details are not repeated herein.

Figure 5:
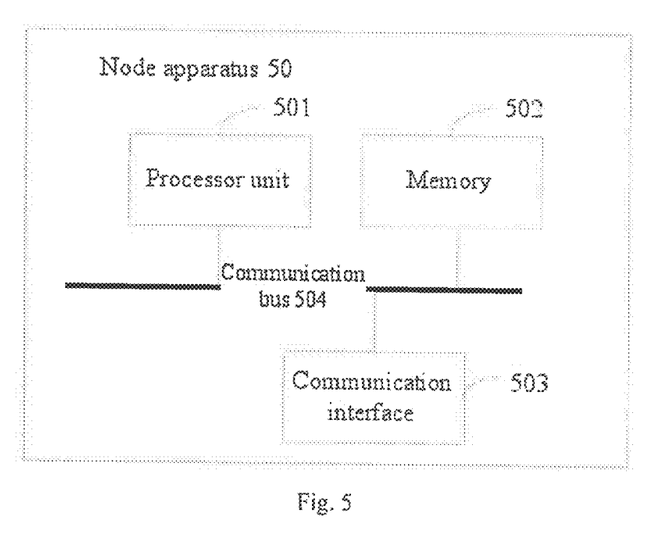
FIG. 5 is a structural diagram of a node apparatus provided in an embodiment of the present invention.

An embodiment of the present invention further provides a node apparatus 50 for implementing a blockchain mining method provided in the above method embodiment. As shown in FIG. 5, the node apparatus 50 comprises:

a processor unit 501, a communication interface 502, a memory 503 and a communication bus 504; wherein the processor unit 501, the communication interface 502 and the memory 503 communicate with each other through the communication bus 504.

The processor unit 501 may be a multi-core Central Processing Unit CPU, or an ASIC (Application Specific integrated Circuit), or one or more integrated circuits configured to implement the embodiments of the present invention.

The memory 503 is configured to store program codes, and the program codes comprise computer operation instructions and a network flow diagram. The memory 503 may carry a high speed RAM memory, and may also comprise a non-volatile memory such as at least one disk memory.

The communication interface 502 is configured to implement connection communication between these node apparatuses.

The processor unit 501 is configured to execute program codes, the program codes are configured to implement a blockchain mining method provided in the above method embodiment during running, the method comprising:

acquiring a current block number of the blockchain;

judging whether a hash slot corresponding to the block number is consistent with a hash slot corresponding to the node apparatus, wherein the node apparatuses in the blockchain network are distributed in N hash slots by means of a hash algorithm, and N is a positive integer greater than or equal to 2;

determining whether the node apparatus performs mining this time according to a judgment result.

Optionally, determining whether the node apparatus performs mining this time according to a judgment result comprises:

determining that the node apparatus does not perform mining this time when the hash slot corresponding to the block number is consistent with the hash slot corresponding to the node apparatus; and determining that the node apparatus performs mining this time when the hash slot corresponding to the block number is not consistent with the hash slot corresponding to the node apparatus.

Optionally, determining whether the node apparatus performs mining this time according to a judgment result comprises:

determining that the node apparatus performs mining this time if the hash slot corresponding to the block number acquired in consecutive M times is consistent with the hash slot corresponding to the node apparatus, where M is a positive integer greater than or equal to 2.

Optionally, judging whether a hash slot corresponding to the block number is consistent with a hash slot corresponding to the node apparatus comprises:

performing a modulo operation on N by using the block number to obtain a first modulo value;

performing the modulo operation on N by using account information of the node apparatus according to an MD5 algorithm to obtain a second modulo value;

judging whether the first modulo value is consistent with the second modulo value, wherein if the first modulo value is consistent with the second modulo value, it indicates that the hash slot corresponding to the block number is consistent with the hash slot corresponding to the node apparatus, and if the first modulo value is not consistent with the second modulo value, it indicates that the hash slot corresponding to the block number is not consistent with the hash slot corresponding to the node apparatus.

Optionally, the method further comprises:

receiving a block sent by another node apparatus in the block-chain network, wherein the block includes account information of the another node apparatus; and performing proof of work on the block when it is determined that the hash slot corresponding to the block number is not consistent with the hash slot corresponding to the another node apparatus.

In the several embodiments provided in the present application, it should be understood that the disclosed device and method can be implemented in other ways. For example, the device embodiments described above are merely illustrative. For example, the division of the functional modules is only a logical functional and there may be other division manners in actual implementation.

The modules illustrated as separate components may or may not be physically separated. The components displayed as modules may or may not be physical modules, that is, may be located in one place, or may be distributed to multiple network units. Part or all of the modules may be selected according to actual needs to achieve the object of the solution of the embodiment.

In addition, the various functional modules in the various embodiments of the present invention may be integrated into one processing unit, or each module may exist physically separately, or two or more modules may be integrated into one module. The above integrated module may be implemented in the form of hardware or in the form of hardware plus a software functional module.

The integrated module implemented in the form of a software functional module can be stored in a computer readable storage medium. The software functional module is stored in a storage medium and comprises instructions for causing a computer device (which may be a personal computer, server, or network device, etc.) to perform part of steps of the methods described in the embodiments of the present invention. The above-mentioned storage media include: USB disks, mobile hard disks, random access memories (RAMs), magnetic disks or compact disks and other media capable of storing data. That is to say, an embodiment of the present invention further provides a computer readable storage medium for storing a computer program, the computer program comprising instructions for performing the blockchain mining method.

The above is only the detailed description of the present invention, but the protection scope of the present invention is not limited thereto. Changes or substitutions which can be easily conceived by those of skill in the art in the technical scope disclosed by the present invention should fall within the protection scope of the present invention. Therefore, the protection scope of the present invention is defined by the claims.

The invention claimed is:

1. A blockchain mining method applied to a node apparatus in a blockchain network, the method comprising:
    acquiring a current block number of the blockchain;
    judging whether a hash slot corresponding to the current block number is consistent with a hash slot corresponding to the node apparatus,
        wherein node apparatuses in the blockchain network are distributed in N hash slots by means of a hash algorithm, and N is a positive integer greater than or equal to 2; and
    determining whether the node apparatus performs mining this time according to a judgment result,
    wherein judging whether a hash slot corresponding to the current block number is consistent with a hash slot corresponding to the node apparatus comprises:
        performing a modulo operation on N by using the current block number to obtain a first modulo value;
        performing the modulo operation on N by using account information of the node apparatus according to an MD5 algorithm to obtain a second modulo value; and
        judging whether the first modulo value is consistent with the second modulo value, wherein if the first modulo value is consistent with the second modulo value, it indicates that the hash slot corresponding to the current block number is consistent with the hash slot corresponding to the node apparatus, and if the first modulo value is not consistent with the second modulo value, it indicates that the hash slot corresponding to the current block number is not consistent with the hash slot corresponding to the node apparatus.

2. The method according to claim 1, wherein determining whether the node apparatus performs mining this time according to a judgment result comprises:
    determining that the node apparatus does not perform mining this time when the hash slot corresponding to the current block number is consistent with the hash slot corresponding to the node apparatus; and
    determining that the node apparatus performs mining this time when the hash slot corresponding to the current block number is not consistent with the hash slot corresponding to the node apparatus.

3. The method according to claim 1, wherein determining whether the node apparatus performs mining this time according to a judgment result comprises:
    determining that the node apparatus performs mining this time if the hash slot corresponding to the current block number acquired in consecutive M times is consistent with the hash slot corresponding to the node apparatus, where M is a positive integer greater than or equal to 2.

4. The method according to claim 1, further comprising:
    receiving a block sent by another node apparatus in the blockchain network, the block includes account information of the another node apparatus;
    performing proof of work on the block when it is determined that the hash slot corresponding to the current block number is not consistent with the hash slot corresponding to the another node apparatus.

5. A node apparatus, comprising:
    a processor unit, a communication interface, a memory and a communication bus; wherein the processor unit, the communication interface and the memory communicate with each other through the communication bus;
    the memory is configured to store program codes;
    the processor unit is configured to execute the program codes to implement a method comprising:
    acquiring a current block number of the blockchain
    judging whether a hash slot corresponding to the current block number is consistent with a hash slot corresponding to the node apparatus, wherein the node apparatuses in the blockchain network are distributed in N hash slots by means of a hash algorithm, and N is a positive integer greater than or equal to 2;
    determining whether the node apparatus performs mining this time according to a judgment result,
    wherein judging whether a hash slot corresponding to the current block number is consistent with a hash slot corresponding to the node apparatus comprises:
        performing a modulo operation on N by using the current block number to obtain a first modulo value;

performing the modulo operation on N by using account information of the node apparatus according to an MD5 algorithm to obtain a second modulo value; and judging whether the first modulo value is consistent with the second modulo value, wherein if the first modulo value is consistent with the second modulo value, it indicates that the hash slot corresponding to the current block number is consistent with the hash slot corresponding to the node apparatus, and if the first modulo value is not consistent with the second modulo value, it indicates that the hash slot corresponding to the current block number is not consistent with the hash slot corresponding to the node apparatus.

6. A non-transitory computer readable storage medium for storing a computer program, the computer program comprising instructions for performing a method comprising:

acquiring a current block number of the blockchain;

judging whether a hash slot corresponding to the current block number is consistent with a hash slot corresponding to the node apparatus, wherein the node apparatuses in the blockchain network are distributed in N hash slots by means of a hash algorithm, and N is a positive integer greater than or equal to 2;

determining whether the node apparatus performs mining this time according to a judgment result, wherein judging whether a hash slot corresponding to the current block number is consistent with a hash slot corresponding to the node apparatus comprises:

performing a modulo operation on N by using the current block number to obtain a first modulo value;

performing the modulo operation on N by using account information of the node apparatus according to an MD5 algorithm to obtain a second modulo value; and judging whether the first modulo value is consistent with the second modulo value, wherein if the first modulo value is consistent with the second modulo value, it indicates that the hash slot corresponding to the current block number is consistent with the hash slot corresponding to the node apparatus, and if the first modulo value is not consistent with the second modulo value, it indicates that the hash slot corresponding to the current block number is not consistent with the hash slot corresponding to the node apparatus.

* * * * *